（12） United States Patent
Furukoshi et al.

(10) Patent No.: US 10,910,952 B1
(45) Date of Patent: Feb. 2, 2021

(54) CONTROL APPARATUS AND METHOD FOR CURRENT RESONANCE CIRCUIT AND CURRENT RESONANCE POWER SUPPLY

(71) Applicant: Sanken Electric Co., Ltd., Niiza (JP)

(72) Inventors: Ryuichi Furukoshi, Niiza (JP); Osamu Ohtake, Niiza (JP)

(*) Notice: Subject to any disclaimer, the term of this patent is extended or adjusted under 35 U.S.C. 154(b) by 0 days.

(21) Appl. No.: 16/686,266

(22) Filed: Nov. 18, 2019

(30) Foreign Application Priority Data

Oct. 18, 2019 (CN) .......................... 2019 1 0992668

(51) Int. Cl.
 *H02M 3/335* (2006.01)
 *H02M 1/08* (2006.01)
 *H02M 1/00* (2006.01)

(52) U.S. Cl.
 CPC ......... *H02M 3/33569* (2013.01); *H02M 1/08* (2013.01); *H02M 2001/0003* (2013.01); *H02M 2001/0054* (2013.01)

(58) Field of Classification Search
 CPC ......... H02M 3/33538; H02M 3/33546; H02M 3/33515; H02M 3/33576; H02M 3/33592; H02M 3/33553; H02M 3/33523; H02M 2001/0054; H02M 2001/0003
 See application file for complete search history.

(56) References Cited

U.S. PATENT DOCUMENTS 8,804,377 B2 * 8/2014 Adragna ............. H02M 3/3376
 363/21.02
10,171,003 B1 * 1/2019 Adragna ................. H02M 1/08

* cited by examiner

*Primary Examiner* — Adolf D Berhane
*Assistant Examiner* — Afework S Demisse
(74) *Attorney, Agent, or Firm* — Harness, Dickey & Pierce, P.L.C.

(57) ABSTRACT

Embodiments of this disclosure provide a control apparatus and method for a current resonance circuit and a current resonance power supply. The control method includes: performing integration on a resonance current of the current resonance circuit or a switching current of one or more switching elements to generate an integration signal; generating a feedback signal of the current resonance circuit; comparing the integration signal with the feedback signal, and generating a measurement signal according to a comparison result; performing digital filtering on the measurement signal; and according to the measurement signal after filtering, generating a pulse width modulation signal controlling the switching elements.

10 Claims, 7 Drawing Sheets

CONTROL APPARATUS AND METHOD FOR CURRENT RESONANCE CIRCUIT AND CURRENT RESONANCE POWER SUPPLY

TECHNICAL FIELD

This disclosure relates to the field of circuit technologies.

BACKGROUND

At present, there is a need to achieve miniaturization and low cost of a power supply system. As a scheme for stably outputting a current or a voltage, a DC resonance power supply or a direct current/direct current (DC/DC) circuit having a current resonance circuit is widely used. For example, a DC/DC converter having a current resonance circuit is able to generate a high-efficiency power supply with a low switching loss.

However, in such an apparatus, a current flowing through a switching element is not proportional to the on time, and it is necessary to determine a transmission power by smoothing a signal for a certain period of time and by comparing a voltage with a target value. Therefore, a problem of delay of control response will occur, and it is necessary to increase a capacity of a capacitor for output or input smoothing. In order to solve this problem, there has been a scheme in which integration is performed on a current flowing through a switching element and estimation is performed according to a result of integration to control an output power.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that if the output power is controlled only according to the result of integration, an output voltage will vary greatly due to influence of noises, thereby affecting stability of controlling in the power supply system.

Directed to at least one of the above problems, embodiments of this disclosure provide a control apparatus and method for a current resonance circuit and a current resonance power supply.

According to one aspect of the embodiments of this disclosure, there is provided a control apparatus for a current resonance circuit, which controls one or more switching elements of the current resonance circuit, the control apparatus including:

an integration circuit configured to perform integration on a resonance current of the current resonance circuit or a switching current of the one or more switching elements to generate an integration signal;

a feedback circuit configured to generate a feedback signal of the current resonance circuit;

a comparison circuit configured to compare the integration signal with the feedback signal, and generate a measurement signal according to a comparison result;

a first digital filtering circuit configured to perform digital filtering on the measurement signal; and a PWM circuit configured to, according to the measurement signal after filtering, generate a pulse width modulation signal controlling the one or more switching elements.

According to another aspect of the embodiments of this disclosure, there is provided a control method for a current resonance circuit, which controls one or more switching elements of the current resonance circuit, the control method including:

performing integration on a resonance current of the current resonance circuit or a switching current of the one or more switching elements to a generate integration signal;

generating a feedback signal of the current resonance circuit;

comparing the integration signal with the feedback signal, and generating a measurement signal according to a comparison result;

performing digital filtering on the measurement signal; and according to the measurement signal after filtering, generating a pulse width modulation signal controlling the one or more switching elements.

According to a further aspect of the embodiments of this disclosure, there is provided a current resonance power supply, including:

a current resonance circuit including one or more switching elements and a resonance capacitor and configured to convert an input current into an output current;

a load using the output current; and the control apparatus as described above configured to control the one or more switching elements of the current resonance circuit.

An advantage of the embodiments of this disclosure exists in that the integration signal is compared with the feedback signal, a measurement signal is generated according to a comparison result, and according to the measurement signal after filtering, a pulse width modulation (PWM) signal controlling the one or more switching elements is generated. Hence, not only influence of noises is lowered and stability of control is improved, but also structures of the circuits are simple and cost is lowered, and miniaturization of the power supply system is achieved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION OF THE INVENTION

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the current resonance power supply may be a DC/DC converter having a current resonance circuit, in which a half-bridge or full-bridge manner may be adopted. However, this disclosure is not limited thereto, and it may also be another device having a current resonance circuit.

Embodiments of a First Aspect

The embodiments of this disclosure provide a control apparatus for a current resonance circuit, which controls one or more switching elements of the current resonance circuit. The embodiments of this disclosure further provide a current resonance power supply, including a current resonance circuit, a load and a control apparatus.

Figure 1:
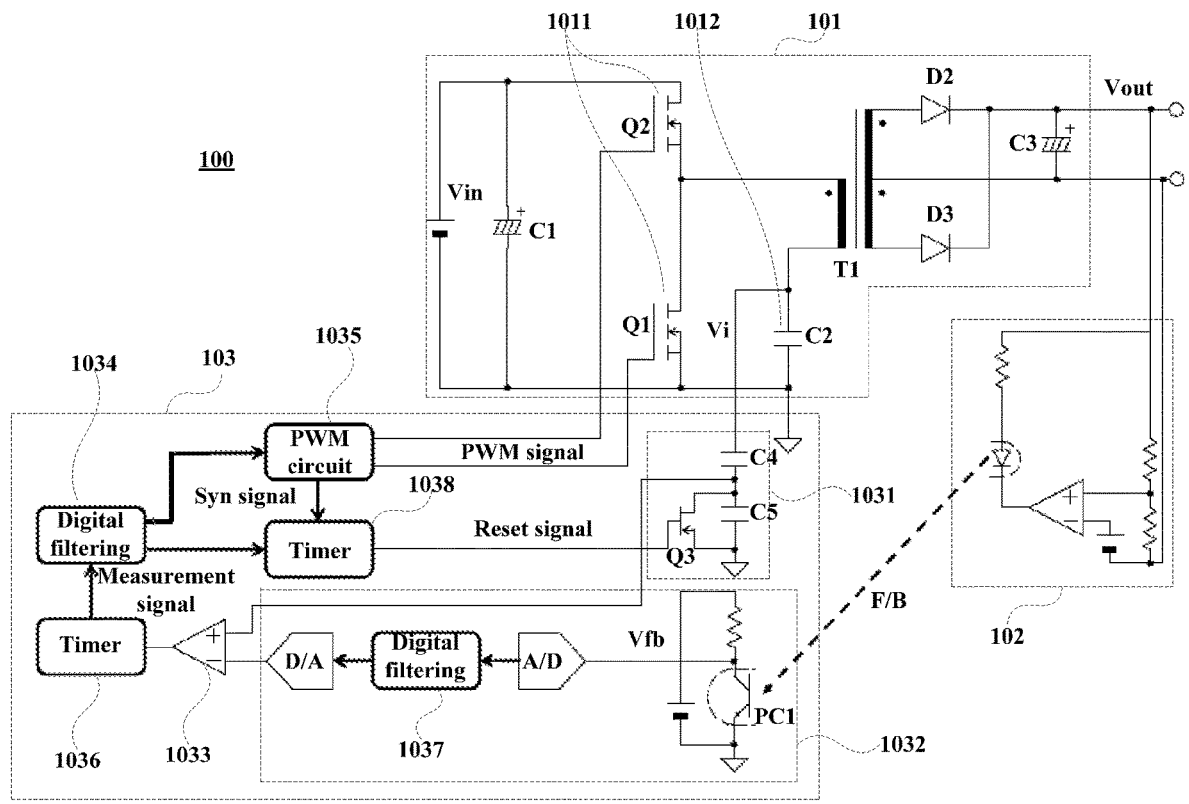
FIG. 1 is a schematic diagram of the current resonance power supply of an embodiment of this disclosure.

FIG. 1 is a schematic diagram of the current resonance power supply of the embodiment of this disclosure, which shall be described by taking a half-bridge circuit as an example.

As shown in FIG. 1, the current resonance power supply 100 includes: a current resonance circuit 101 including one or more switching elements 1011 (Q1 and Q2) and a resonance capacitor 1012 (C2) and configured to convert an input voltage Vin into an output voltage Vout (or convert an input current Iin into an output current Iout); a load 102 using the output voltage Vout (or the output current Iout); and a control apparatus 103 configured to control the switching elements 1011 of the current resonance circuit 101.

As shown in FIG. 1, the control apparatus 103 includes:

an integration circuit 1031 configured to perform integration on a resonance current of the current resonance circuit 101 or a switching current of the switching elements 1011 to generate an integration signal (hereinafter denoted by Vi);

a feedback circuit 1032 configured to generate a feedback signal (hereinafter denoted by Vfb) of the current resonance circuit 101;

a comparison circuit 1033 configured to compare the integration signal Vi with the feedback signal Vfb, and generate a measurement signal according to a comparison result;

a first digital filtering circuit 1034 configured to perform digital filtering on the measurement signal; and a PWM circuit 1035 configured to, according to the measurement signal after digital filtering, generate a PWM signal controlling the switching elements 1011.

For example, the PWM signal may include ON width control signals of the switching elements 1011 (Q1 and Q2), and the ON signals may be alternately output for the switching elements. Furthermore, an output frequency may be varied non-fixedly. Regarding the specific content of the PWM signal, reference may also be made to some related arts.

It should be appreciated that the current resonance power supply of the embodiment of this disclosure is illustrated in FIG. 1; however, this disclosure is not limited thereto. For example, connection relationships between modules or components may be appropriately adjusted; and furthermore, some other modules or components may be added, or some of these modules or components may be reduced. And appropriate variants may be made by those skilled in the art according to what is described above, without being limited to the disclosure contained in FIG. 1.

As shown in FIG. 1, the current resonance power supply 100 further includes a transformer T1; the switching elements Q1 and Q2 being configured at a primary side of the transformer T1, and the load 102 being configured at a secondary side of the transformer T1. Capacitors C1, C4 and C5 and a switching element Q3 (as described later) are also configured at the primary side, and diodes D2 and D3 and a capacitor C3, etc., are also configured at the secondary side; and furthermore, it includes electronic elements, such as an optical coupler transmitting and receiving feedback (F/B), etc. Reference may be made to related techniques for particulars of these elements and components.

In some embodiments, as shown in FIG. 1, the control apparatus 103 further includes:

a first timer 1036 configured to accumulate a time in which the integration signal exceeds the feedback signal or a time in which the feedback signal exceeds the integration signal in a period (or cycle).

In some embodiments, the first digital filtering circuit 1034 performs at least one of the following digital processing on the measurement signal according to a set time and/or a time of the first timer 1036: averaging, neglecting an abnormal value, estimating; however, this disclosure is not limited thereto.

For example, multiple signal values in multiple time periods are averaged, and a result of averaging is taken as a measurement signal in a period. For another example, one or more signal values in a period that are obviously abnormal are removed. And for further example, multiple signal values in multiple time periods are reconstructed to estimate a measurement signal in a period.

Comparison of a case where first digital filtering is performed and a case where first digital filtering is not performed shall be described below.

Figure 2:
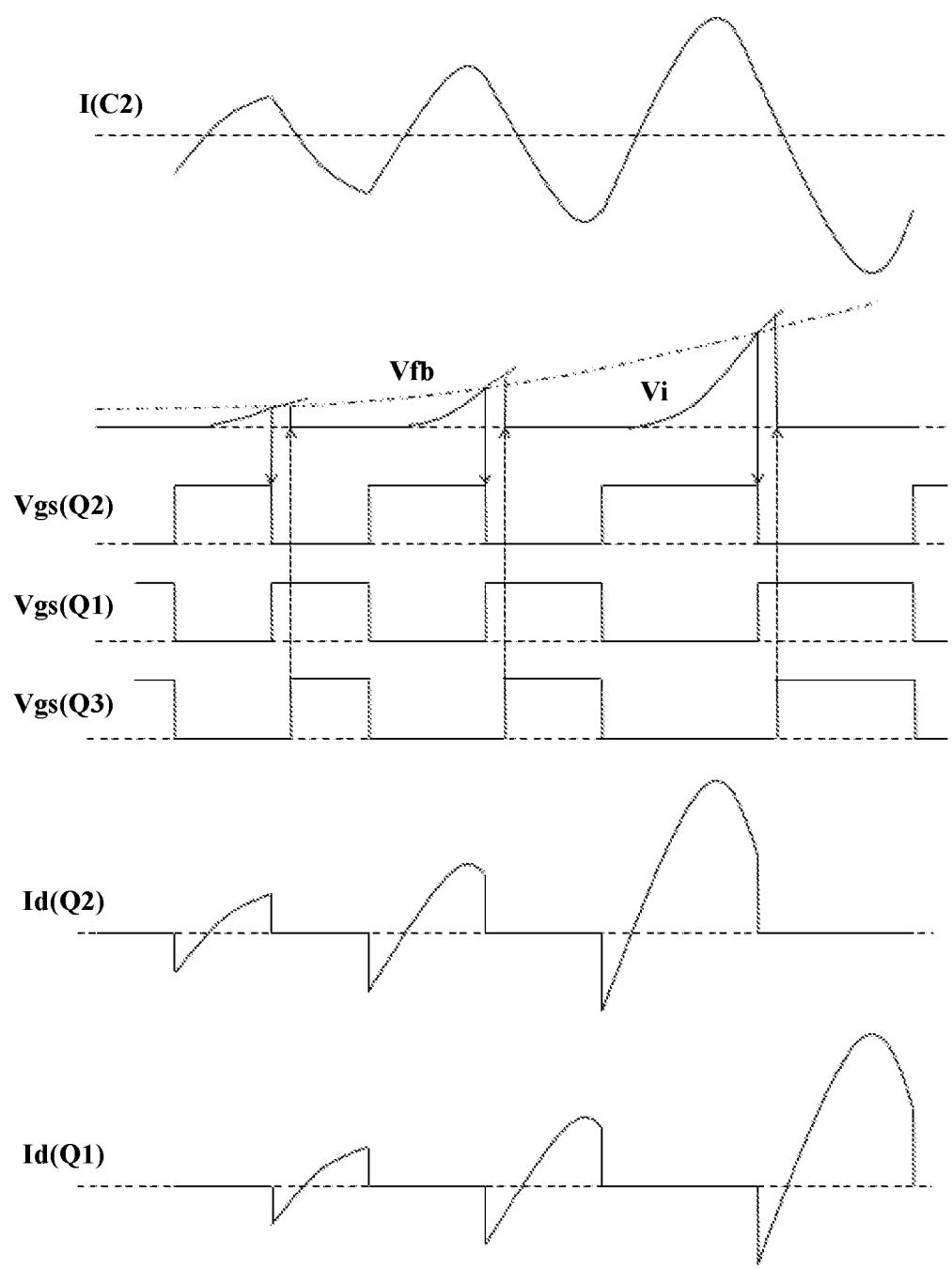
FIG. 2 is an exemplary diagram of signals when the first digital filtering is not performed.

FIG. 2 is an exemplary diagram of signals when the first digital filtering is not performed. As shown in FIG. 2, a current I(C2) flowing through the resonance capacitor, currents Id(Q1) and Id(Q2) flowing through the switching elements become more and more distorted due to noises, and accordingly, voltages Vgs(Q1), Vgs(Q2) and Vgs(Q3) of the switching elements also are affected, resulting in distortion of the output voltage and an unstable controlling.

Figure 3:
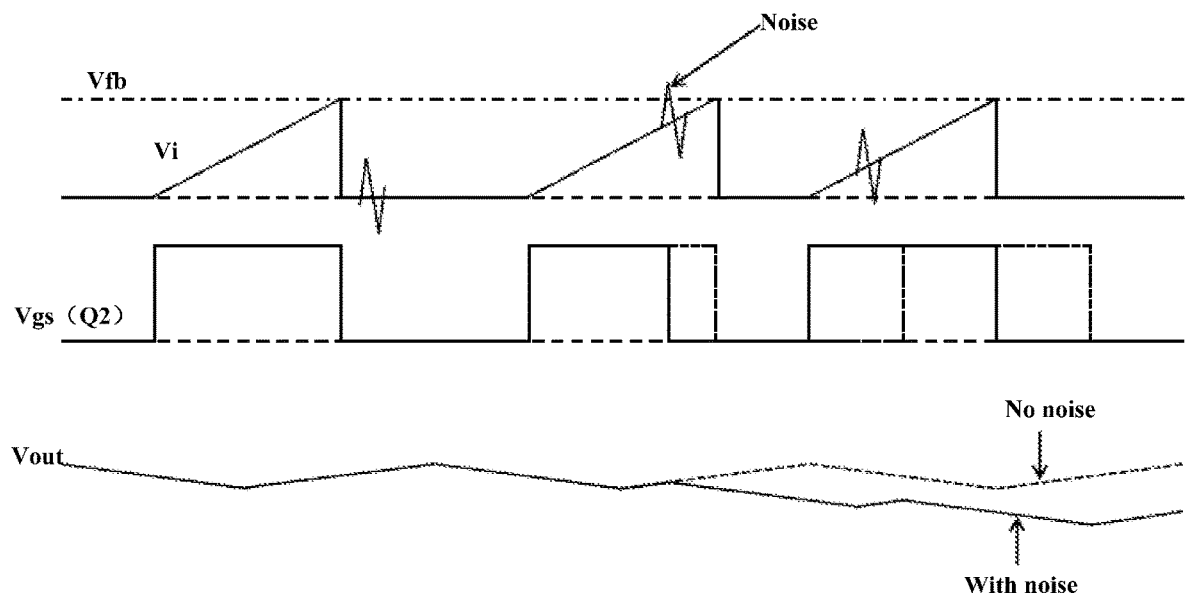
FIG. 3 is an exemplary diagram of a part of signals with noises being removed of an embodiment of this disclosure.

FIG. 3 is an exemplary diagram of a part of signals with noises being removed of the embodiment of this disclosure. As shown in FIG. 3, if a noise occurs in the integration signal Vi, a waveform of, for example, Vgs (Q2) (as shown by solid lines), will be affected, which will affect a waveform of the output voltage Vout (as shown by solid lines), and will result in an unstable controlling.

As shown in FIG. 3, the first digital filtering circuit 1034 is used in the embodiment of this disclosure to perform digital processing on the measurement signal, which will reduce or even eliminate influence of the noise in the integration signal Vi, without affecting the waveform of, for example, Vgs(Q2) (as shown by dotted lines), the waveform of the output voltage Vout (as shown by dotted lines) will not be affected, and the stability of controlling will be maintained.

It should be appreciated that description is given in FIG. 1 by taking the first digital filtering circuit 1034 and the PWM circuit 1035 as an example, the two being taken as independent components. However, this disclosure is not limited thereto. For example, the function of digital processing of the first digital filtering circuit 1034 may also be integrated into or included in the PWM circuit 1035.

The digital processing of the first digital filtering circuit is illustrated above. The digital processing of the feedback signals shall be described below.

Figure 4:
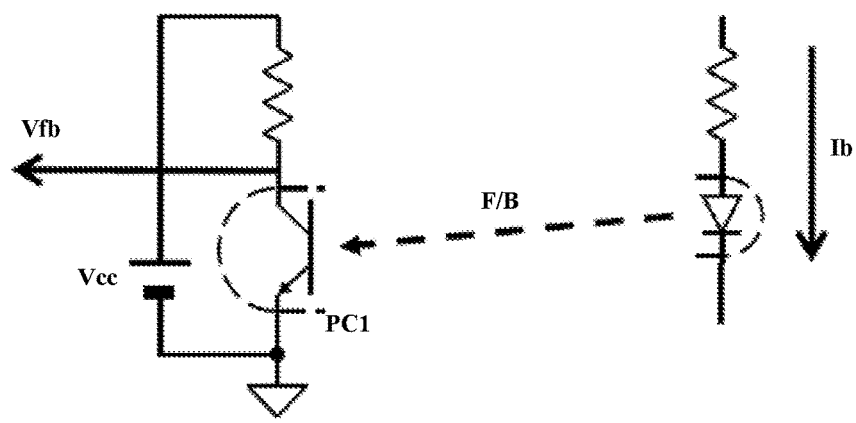
FIG. 4 is a schematic diagram of a part of elements transmitting and receiving feedback.

FIG. 4 is a schematic diagram of a part of elements transmitting and receiving feedback (F/B), in which a feedback signal Vfb is obtained at the primary side according to a load current Ib at the secondary side. Reference can be made to related techniques for particulars of components, such as the optical coupler PC1, etc.

Figure 5:
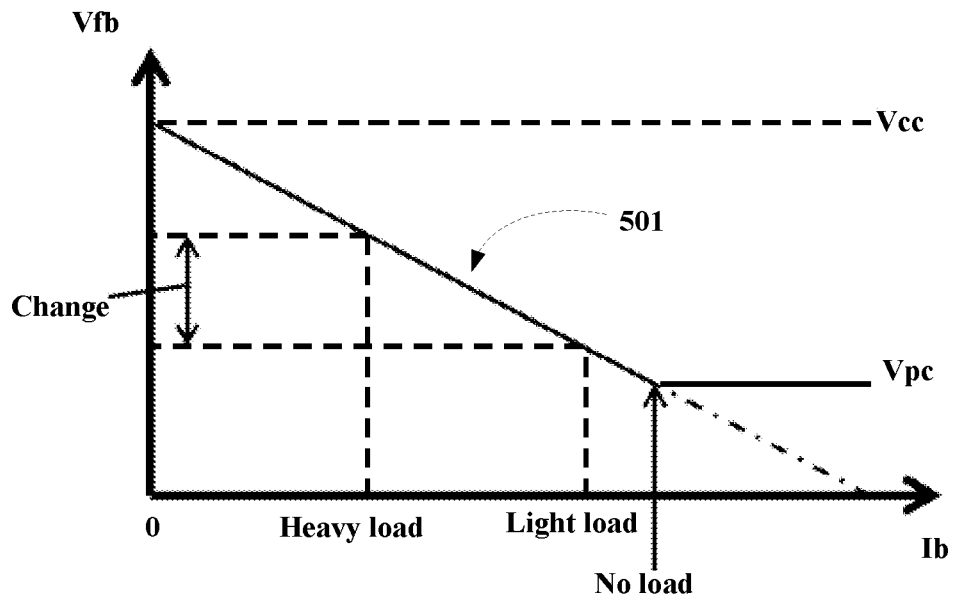
FIG. 5 is an exemplary diagram of a relationship between a feedback signal and a load current when the second digital filtering is not performed.

FIG. 5 is an exemplary diagram of a relationship between the feedback signal Vfb and the load current Ib when the second digital filtering is not performed. As shown in FIG. 5, Vfb and Ib is substantially in a linear relationship (such as a straight line 501 shown in FIG. 5). However, as shown in FIG. 5, under influence of saturation of electronic components, such as the optical coupler, Vfb will not fall to 0 at no load, but a saturation voltage Vpc will still exist.

Figure 6:
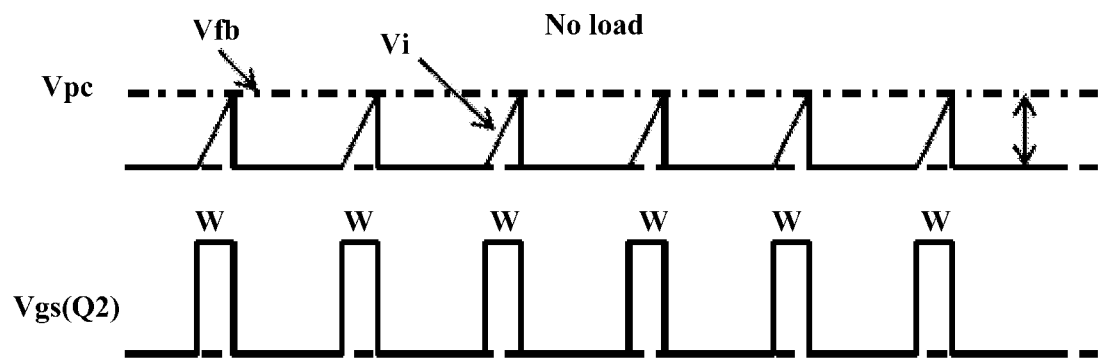
FIG. 6 is an exemplary diagram of a part of signals at no load when the second digital filtering is not performed.

FIG. 6 is an exemplary diagram of a part of signals at no load when the second digital filtering is not performed. As shown in FIG. 6, due to the influence of the saturation voltage Vpc, even in the case of no load, the waveform of Vgs(Q2) still has a certain width W, so that the on-time at no load cannot be sufficiently shortened, possibly resulting in increase of loss.

Furthermore, as shown in FIG. 5, a slope of the straight line 501 is relatively small, and when the load changes (such as changing between a light load and a heavy load), an amount of change of Vfb is relatively small, that is, the dynamic adjustment range is relatively narrow, thereby making controlling gains difficult to be adjusted, and also, Vfb is susceptible to noises.

In some embodiments of this disclosure, as shown in FIG. 1, the feedback circuit 1032 includes:

an analog-to-digital (A/D) converter configured to convert the received feedback signal from an analog signal into a digital signal;

a second digital filtering circuit 1037 configured to perform digital filtering on the analog-to-digital converted feedback signal; and a digital-to-analog (D/A) converter configured to convert the digital filtered feedback signal from a digital signal into an analog signal.

In some embodiments, the second digital filtering circuit 1037 performs such digital processing on the feedback signal that a dynamic adjustment range is increased and/or a saturation voltage when there is no load is decreased.

For example, the second digital filtering circuit 1037 performs the following digital processing:

$$Vfb\_2 = A \times (Vfb\_1 - Vpc); \quad (1)$$

where, Vfb_1 is a feedback voltage before the digital processing, Vfb_2 is a feedback voltage after the digital processing, A is a constant of gain adjustment, and Vpc is a saturation voltage when there is no load due to saturation of an electronic element.

Figure 7:
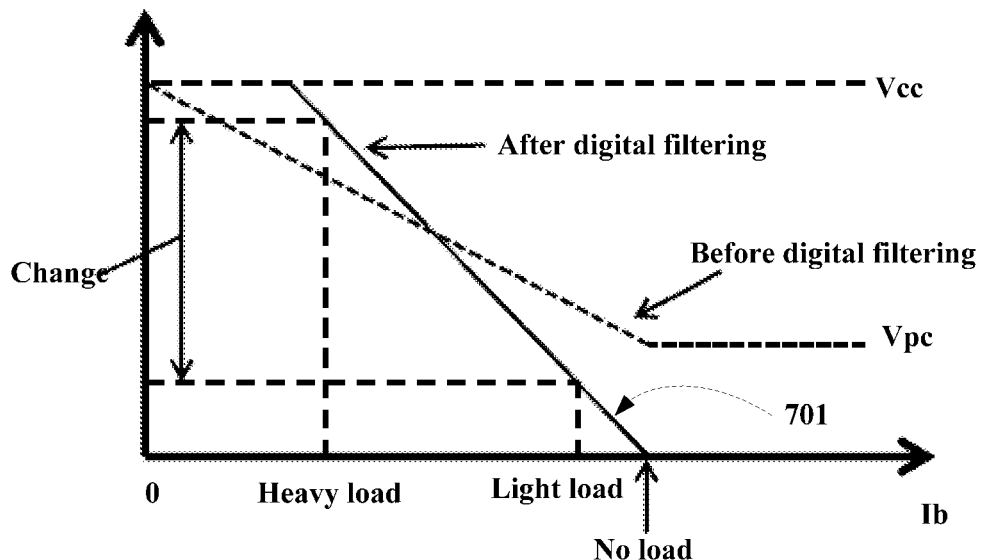
FIG. 7 is an exemplary diagram of a relationship between a feedback signal and a load current of an embodiment of this disclosure.

FIG. 7 is an exemplary diagram of a relationship between the feedback signal Vfb and the load current Ib of the embodiment of this disclosure. As shown in FIG. 7, by the digital processing of the second digital filtering circuit 1037, a slope of a straight line 701 is increased, and when the load changes (such as changing between a light load and a heavy load), the amount of change of Vfb is relatively large, that is, the dynamic adjustment range is relatively wide, making the controlling gain easy to be adjusted, and also, it is possible to lower or remove the influence of noises on Vfb. Furthermore, as shown in FIG. 7, by the digital processing of the second digital filtering circuit 1037, influence of the saturation voltage Vpc is removed, and even if saturation occurs in electronic components, such as the optical coupler, the feedback voltage Vfb is able to be lowered to 0 when there is no load.

Figure 8:
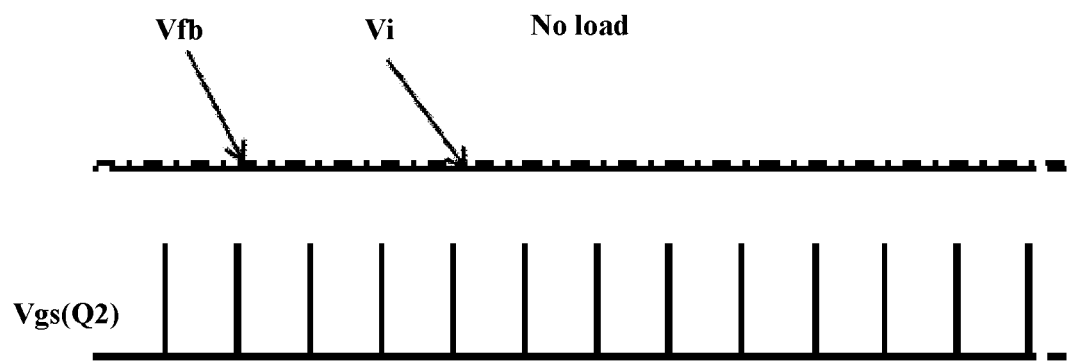
FIG. 8 is an exemplary diagram of a part of signals at no load of an embodiment of this disclosure.

FIG. 8 is an exemplary diagram of a part of signals at no load of the embodiment of this disclosure. As shown in FIG. 8, since the influence of the saturation voltage Vpc is removed, the waveform of Vgs(Q2) will not present a certain width (such as presenting the straight lines shown in FIG. 8) at no load, so that the on-time is able to be sufficiently shortened at no load, thereby reducing loss.

It should be appreciated that the above description has been made by taking the formula (1) as an example, but the present disclosure is not limited thereto, and the formula (1) may be appropriately modified. For example, it is possible to only increase the dynamic adjustment range, or only to reduce the saturation voltage when there is no load, and so on.

Furthermore, by the digital filtering in the embodiment of this disclosure (the digital processing of the first digital filtering circuit and/or the second digital filtering circuit) accurate controlling is able to be performed with a simple circuit, for example, currents flowing through D2 and D3 are able to be accurately controlled. When impedance of the load changes, changes in the currents flowing through D2 and D3 are larger than changes in voltages at two ends of a smoothing capacitor for output. Therefore, a response of the embodiment of this disclosure is faster than that in a scheme in which controlling is performed by a feedback signal. Furthermore, by performing digital processing based on digital circuits, it is possible to achieve stability of controlling and reduce costs.

In some embodiments, the integration circuit 1031 includes:

an integration capacitor (C5) configured to perform integration on a resonance current of the current resonance circuit 101 or a switching current of the switching elements 1011; and an integration switch (Q3) configured to perform switch controlling on the integration capacitor (C5).

As shown in FIG. 1, the capacitor C4 splits a current flowing through the capacitor C2 by a certain proportion and perform integration via the integrating capacitor C5. Currents integrated in the embodiment of this disclosure are not limited to the case shown in FIG. 1, and may be currents proportional to the resonance current flowing through the current resonance circuit 101, or may be proportional to the switching current flowing through the switching element 1011. Reference can be made to related techniques for contents of the integration.

In some embodiments, as shown in FIG. 1, the control apparatus 103 further includes:

a second timer 1038 configured to, according to the digital filtered measurement signal and a synchronization signal of the PWM circuit 1035, generate a reset signal controlling the integration switch (Q3).

Hence, the integration signal Vi is generated with a simple structure, and accuracy and stability of the integration signal are improved.

Figure 9:
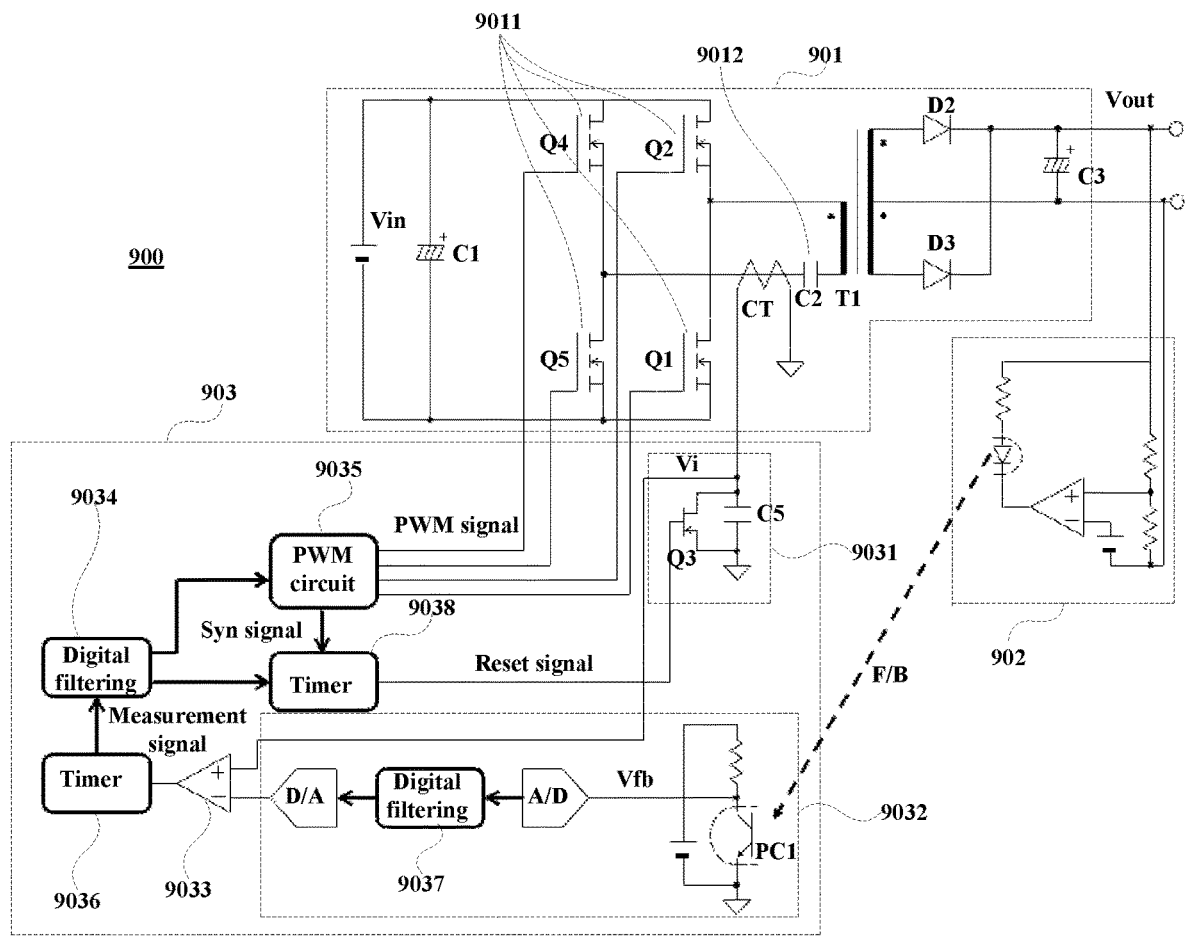
FIG. 9 is another schematic diagram of the current resonance power supply of the embodiment of this disclosure.

The above description is given by taking a half-bridge circuit as an example; however, this disclosure is not limited thereto. FIG. 9 is a schematic diagram of the current resonance power supply of the embodiment of this disclosure, which shall be described taking a full-bridge circuit as an example.

As shown in FIG. 9, the current resonance power supply 900 includes: a current resonance circuit 901 including one or more switching elements 9011 (Q1, Q2, Q4 and Q5) and a resonance capacitor 9012 (C2) and configured to convert an input voltage Vin into an output voltage Vout (or convert an input current Iin into an output current Iout); a load 902 using the output voltage Vout; and a control apparatus 903 configured to control the switching elements 9011 of the current resonance circuit 901.

It should be appreciated that the current resonance power supply of the embodiment of this disclosure is illustrated in FIG. 9; however, this disclosure is not limited thereto. For example, connection relationships between modules or components may be appropriately adjusted; and furthermore, some other modules or components may be added, or some of these modules or components may be reduced. And appropriate variants may be made by those skilled in the art according to what is described above, without being limited to the disclosure contained in FIG. 9.

As shown in FIG. 9, the current resonance power supply 900 further includes a transformer T1, the switching elements Q1, Q2, Q4 and Q5 being configured at a primary side of the transformer T1, and the load 902 being configured at a secondary side of the transformer T1. Capacitors C1 and C5 and a switching element Q3 are also configured at the primary side, and diodes D2 and D3 and a capacitor C3, etc., are also configured at the secondary side; and furthermore, it includes electronic elements, such as an optical coupler transmitting and receiving feedback (F/B), etc. Reference is able to be made to related techniques for particulars of these elements and components. Moreover, components in FIG. 9 identical or corresponding to those in FIG. 1 are as described above, which shall not be described herein any further.

This disclosure is described above by way of the embodiments. However, this disclosure is not limited thereto, and variants may be made to the above embodiments. For example, the above embodiments may be used separately, or may be used by combining one or more of them.

It can be seen from the above embodiments that the integration signal is compared with the feedback signal, a measurement signals is generated according to a comparison result, and according to the measurement signal after filtering, a pulse width modulation (PWM) signal controlling the switching elements is generated. Hence, not only influence of noises is lowered and stability of controlling is improved, but also structures of the circuits are simple and cost is lowered, and miniaturization of the power supply system is achieved.

Embodiments of a Second Aspect

The embodiments of this disclosure provide a control method for a current resonance circuit, which controls one or more switching elements of the current resonance circuit. As the current resonance circuit has been described in the embodiment of the first aspect, its contents are incorporated herein, with identical contents being not going to be described herein any further.

Figure 10:
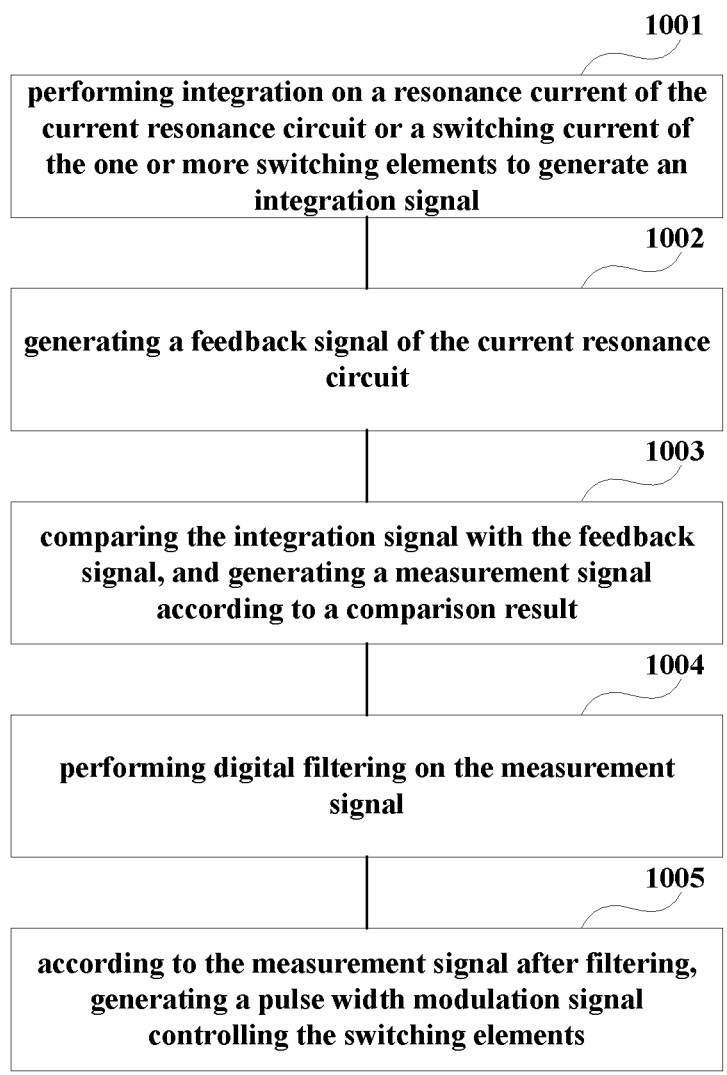
FIG. 10 is a flowchart of the control method for a current resonance circuit of an embodiment of this disclosure.

FIG. 10 is a flowchart of the control method for a current resonance circuit of the embodiment of this disclosure. As shown in FIG. 10, the method includes:

1001: performing integration on a resonance current of the current resonance circuit or a switching current of the one or more switching elements to generate an integration signal;

1002: generating a feedback signal of the current resonance circuit;

1003: comparing the integration signal with the feedback signal, and generating a measurement signal according to a comparison result;

1004: performing digital filtering on the measurement signal; and

1005: according to the measurement signal after filtering, generating a pulse width modulation signal controlling the switching elements.

It should be appreciated that the embodiment of this disclosure is described in FIG. 10. However, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 10.

The above apparatuses and method of this disclosure may be implemented by hardware, or by hardware in combination with software. This disclosure relates to such a computer-readable program that when the program is executed by a logic device, the logic device is enabled to carry out the apparatus or components as described above, or to carry out the method or steps as described above. This disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in the figures may either correspond to software modules of procedures of a computer program, or correspond to hardware modules. Such software modules may respectively correspond to the steps shown in the figures. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

The invention claimed is:

1. A control apparatus for a current resonance circuit, which controls one or more switching elements of the current resonance circuit, characterized in that the control apparatus comprises:
an integration circuit configured to perform integration on a resonance current of the current resonance circuit or a switching current of the one or more switching elements to generate an integration signal;
a feedback circuit configured to generate a feedback signal of the current resonance circuit;
a comparison circuit configured to compare the integration signal with the feedback signal, and generate a measurement signal according to a comparison result;
a first digital filtering circuit configured to perform digital filtering on the measurement signal; and
a PWM circuit configured to, according to the measurement signal after filtering, generate a pulse width modulation signal controlling the one or more switching elements.

2. The control apparatus according to claim 1, wherein the control apparatus further comprises:
a first timer configured to accumulate a time in which the integration signal exceeds the feedback signal or a time in which the feedback signal exceeds the integration signal.

3. The control apparatus according to claim 2, wherein the first digital filtering circuit performs at least one of the following digital processing on the measurement signal according to a set time and/or a time of the first timer: averaging, neglecting an abnormal value, estimating.

4. The control apparatus according to claim 1, wherein the feedback circuit comprises:
an analog-to-digital converter configured to convert the received feedback signal from an analog signal into a digital signal;
a second digital filtering circuit configured to perform digital filtering on the analog-to-digital converted feedback signal; and
a digital-to-analog converter configured to convert the digital filtered feedback signal from a digital signal into an analog signal.

5. The control apparatus according to claim 4, wherein the second digital filtering circuit performs such digital processing on the feedback signal that a dynamic adjustment range is increased and/or a saturation voltage when there is no load is decreased.

6. The control apparatus according to claim 4, wherein the second digital filtering circuit performs the following digital processing:

$$Vfb\_2 = A \times (Vfb\_1 - Vpc);$$

where, Vfb_1 is a feedback voltage before the digital processing, Vfb_2 is a feedback voltage after the digital processing, A is a constant of gain adjustment, and Vpc is a saturation voltage when there is no load due to saturation of an electronic element.

7. The control apparatus according to claim 1, wherein the integration circuit comprises:
an integration capacitor configured to perform integration on a resonance current of the current resonance circuit or a switching current of the one or more switching elements; and
an integration switch configured to perform a switch controlling on the integration capacitor.

8. The control apparatus according to claim 7, wherein the control apparatus further comprises:
a second timer configured to, according to the digital filtered measurement signal and a synchronization signal of the PWM circuit, generate a reset signal controlling the integration switch.

9. A control method for a current resonance circuit, which controls one or more switching elements of the current resonance circuit, characterized in that the control method comprises:

- performing integration on a resonance current of the current resonance circuit or a switching current of the one or more switching elements to generate an integration signal;
- generating a feedback signal of the current resonance circuit;
- comparing the integration signal with the feedback signal, and generating a measurement signal according to a comparison result;
- performing digital filtering on the measurement signal; and
- according to the measurement signal after filtering, generating a pulse width modulation signal controlling the one or more switching elements.

10. A current resonance power supply, characterized in that the current resonance power supply comprises:

- a current resonance circuit comprising one or more switching elements and a resonance capacitor and configured to convert an input current into an output current;
- a load using the output current; and
- a control apparatus configured to perform integration on a resonance current of the current resonance circuit or a switching current of the one or more switching elements to generate an integration signal, generate a feedback signal of the current resonance circuit, compare the integration signal with the feedback signal, and generate a measurement signal according to a comparison result, perform digital filtering on the measurement signal, and according to the measurement signal after filtering, generate a pulse width modulation signal controlling the one or more switching elements.

* * * * *